3,637,679
QUATERNARY PHENOTHIAZINE SULFAMATE
Calvin Lovell, Morton Grove, and Henry William Sause, Deerfield, Ill., assignors to G. D. Searle & Co., Chicago, Ill.
No Drawing. Filed Oct. 30, 1968, Ser. No. 772,024
Int. Cl. C07d 93/14
U.S. Cl. 260—243         5 Claims

ABSTRACT OF THE DISCLOSURE

Phenothiazinylalkylammonium salts of sulfamic acids are described herein. They are useful as anti-ulcer agents, pepsin inhibitors, anti-bacterial agents, and anti-algal agents. The compounds are obtained by the reaction of the appropriate quaternary ammonium halide with silver oxide and an appropriate sulfamic acid.

---

The present invention relates to phenothiazine derivatives of sulfamic acids. More particularly, it relates to trialkyl(phenothiazinylalkyl)ammonium sulfamates which have the following general formula

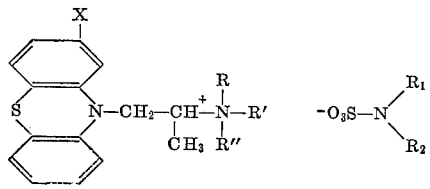

wherein X is selected from the group consisting of hydrogen, methyl, and halogen; R, R', and R" are each lower alkyl; $R_1$ is selected from the group consisting of cyclohexyl and lower alkyl; and $R_2$ is selected from the group consisting of hydrogen and lower alkyl.

The halogen atoms referred to above include fluorine, chlorine, bromine, and iodine. The lower alkyl radicals referred to above contain up to 6 carbon atoms and can be exemplified by radicals such as methyl, ethyl, propyl, isopropyl, and butyl.

The compounds of the present invention are prepared by the reaction of a quaternary ammonium halide of the formula

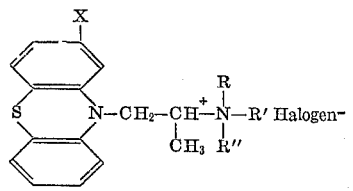

wherein X, R, R', and R" are defined as above and halogen is preferably bromine or iodine, with an appropriate sulfamic acid and silver oxide.

The compounds of the present invention are useful because of their pharmacological properties. In particular, the present compounds are useful as anti-ulcer agents, anti-spasmodics, and pepsin inhibitors. The anti-ulcer utility of the present compounds can be demonstrated by their ability to inhibit ulceration in the Shay rat. The ulceration occurs in rats subjected to fasting and pyloric ligation as reported by Shay et al., Gastroenterology, 5, 43 (1945). In the test, male Charles River rats weighing 200–250 grams and fasted 72 hours prior to ligation are used. Immediately following ligation, the prescribed dose of compound dissolved or suspended in 1.0 ml. of pH 2.0 hydrochloric acid is intragastrically administered to each of a group of 6 animals. A like group of animals receives the acid alone and serves as controls. Precisely 19 hours later, the stomachs of surviving animals are excised and examined under 5× magnification. Any ulcers present are rated according to number and size and a compound found to produce a significant decrease in ulceration compared to the control animals is rated as active. When diethylmethyl[1-(10-phenothiazinyl)-2-propyl]ammonium cyclohexanesulfamate and [1-(10-phenothiazinyl) - 2 - propyl]triethylammonium cyclohexanesulfamate were tested at 50 mg. according to this procedure, each produced a significant decrease in ulceration.

The present compounds are also anti-bacterial agents and anti-algal agents. Thus, they inhibit the growth of bacteria such as *Diplococcus pneumoniae*, and algae such as *Chlorella vulgaris*. The present compounds can thus be combined with various known excipients and adjuvants in the form of dusts, solutions, suspensions, ointments, and sprays to provide compositions useful for disinfecting purposes. The present compounds have also been found to inhibit germination of seeds of Trifolium.

A particular advantage of the present compounds with regard to their anti-spasmodic and anti-ulcer activity is the fact that they permit the preparation of stable aqueous solutions. Thus, it is often desirable to use sympatholytic anti-ulcer agents in aqueous solutions either for oral administration or for injection. However, phenothiazine quaternary ammonium compounds, which are otherwise useful, are not suitable for such use in that they decompose and/or discolor on standing to provide solutions which are no longer suitable. To overcome this problem, sympatholytic compounds have been prepared in dry ampule form. That is, the dry solid material is sealed in an ampule which is opened and dissolved in the appropriate medium immediately before it is to be used. However, this makes it necessary to prepare a new solution each time it is desired to administer the substance. In contrast, the present invention provides compounds which are stable in solutions. Thus, it is possible to provide these materials in aqueous solutions in ampules so that they can be used immediately without the necessity of preparing a solution after the ampule is opened. Alternately, it would be possible to use the present solids to prepare larger quantities of solution for use for one day or, perhaps, several days without the necessity of concern over decomposition of the resultant solution.

The following examples are presented to illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1

To a solution of 19 parts of 10-(2-diethylaminopropyl)-phenothiazine in 120 parts of 2-butanone is added 47 parts of methyl bromide in 48 parts of 2-butanone. The pressure bottle is closed and placed in a steam oven for 2 days. The bottle is then cooled and opened and the precipitate which formed is separated by filtration to give diethylmethyl[1-(10-phenothiazinyl)-2-propyl]ammonium bromide melting at about 214–216° C.

EXAMPLE 2

A solution is prepared by dissolving 10 parts of diethylmethyl[1 - (10-phenothiazinyl)-2-propyl]ammonium bromide in 80 parts of absolute ethanol with heating. The solution is then stirred under nitrogen and allowed to cool and 7.0 parts of silver cyclohexanesulfamate is added. The resulting mixture is stirred for 6 hours and then allowed to stand for 16 hours. The mixture is then filtered and the solvent is evaporated from the filtrate by heating under reduced pressure. After the solvent is removed, ether is added to the residue to give a crystalline material which is allowed to stand overnight. The solid is then separated by filtration, dried, and recrystallized from 2-propanol to give diethylmethyl[1-(10-phenothiazinyl)-2-propyl]ammonium cyclohexanesulfamate melting at about 184–187° C. This compound has the following formula

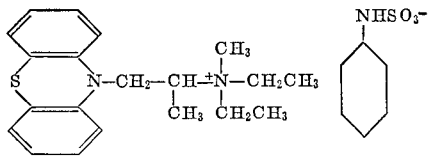

EXAMPLE 3

4.1 parts of diethylmethyl[1-(10-phenothiazinyl)-2-propyl]ammonium bromide is dissolved in 60 parts of methanol and 7 parts of water with stirring. To this solution is added 2.3 parts of silver oxide and the resultant mixture is stirred for 15 minutes before it is filtered to remove some precipitate and the precipitate is washed with methanol. To the filtrate obtained in this way is added 1.5 parts of butylsulfamic acid. When the acid has dissolved, the solution is filtered to remove a small amount of black material. The solvent is evaporated from the residue by heating under reduced pressure. The solid obtained in this way is dissolved in hot 2-propanol, treated with a small amount of charcoal, and filtered. The resultant solution is then cooled and the crystals which form are separated by filtration, washed with cold 2-propanol, and dried to give diethylmethyl[1-(10-phenothiazinyl)-2-propyl]ammonium butylsulfamate melting at about 167–170° C.

EXAMPLE 4

To a solution of 10 parts of 2-chloro-10-(2-diethylaminopropyl)phenothiazine in 40 parts of acetone in a pressure bottle there is added 22.4 parts of ethyl iodide and the bottle is sealed and kept in an oven at 60–65° C. for 18 hours. The bottle is then cooled, 22.4 parts of ethyl iodide is added, and the bottle is again sealed and heated at 60–65° C. for 3 days. The mixture is then cooled to room temperature and filtered. The filtrate is diluted with pentane and the precipitate which forms is separated by filtration to give [1-(2-chloro-10-phenothiazinyl)-2-propyl]triethylammonium iodide melting at about 129–136° C.

In a similar manner, 10 parts of 10-(2-diethylaminopropyl)phenothiazine is reacted with ethyl iodide to give [1-(10-phenothiazinyl)-2-propyl]triethylaminonium iodide melting at about 202–205° C.

EXAMPLE 5

A solution is prepared from 14.1 parts of [1-(10-phenothiazinyl)-2-propyl]triethylammonium iodide, 160 parts of methanol and 20 parts of water. To this solution is added a slurry of silver oxide (obtained from 20.4 parts of silver nitrate and 4.8 parts of sodium hydroxide in 150 parts of distilled water) in 40 parts of methanol. The resulting mixture is stirred in the dark for 30 minutes before it is filtered and the precipitate is washed well with methanol. To the filtrate is added 3.8 parts of dimethylsulfamic acid and the solvent is evaporated from the resulting solution by heating it on a water bath under reduced pressure. Anhydrous ether is added to the residue and some solid forms. The ether is decanted from the solid and then allowed to stand. A precipitate forms and it is separated by filtration and dried to give [1-(10-phenothiazinyl)-2-propyl]triethylammonium dimethysulfamate melting at about 75–80° C. This compound has the following formula

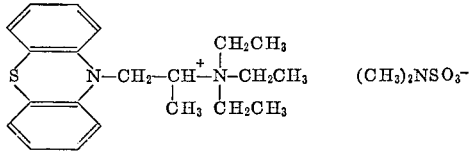

EXAMPLE 6

5.9 parts of [1-(2-chloro-10-phenothiazinyl)-2-propyl]triethylammonium iodide is dissolved in 120 parts of methanol and 20 parts of water is added. To this solution is added 1.4 parts of silver oxide and the mixture is stirred in the dark for 30 minutes. The yellow precipitate which forms is allowed to settle and the supernatant liquid is decanted and filtered through fine paper. The precipitate which is separated is washed with methanol and the washing is combined with the earlier filtrate. 2.1 parts of cyclohexanesulfamic acid is then added to the methanol filtrate and the resultant mixture is stirred until solution is complete. The resultant solution is then filtered and the solvent is evaporated from the filtrate to leave a gray residual solid. This product is [1-(2-chloro-10-phenothiazinyl)-2-propyl]triethylammonium cyclohexanesulfamate. This compound has the following formula

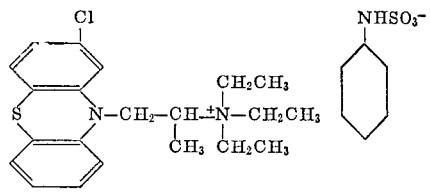

EXAMPLE 7

The procedure of Example 6 is repeated using 2.7 parts of [1-(10-phenothiazinyl)-2-propyl]triethylammonium iodide, 60 parts of methanol, 25 parts of water, 0.73 part of silver oxide, and 1.03 parts of cyclohexanesulfamic acid to give [1-(10-phenothiazinyl)-2-propyl]triethylammonium cyclohexanesulfamate melting at about 170–171° C.

EXAMPLE 8

The procedure of Example 6 is repeated using [1-(10-phenothiazinyl)-2-propyl]trimethylammonium chloride, silver oxide, and cyclohexanesulfamic acid to give [1-(10-phenothiazinyl)-2-propyl]trimethylammonium cyclohexanesulfamate.

EXAMPLE 9

42.6 parts of 2-methylphenothiazine is dissolved in 400 parts of 2-butanone with heating and stirring. To this solution is added, in one portion, 39.5 parts of potassium hydroxide and the mixture is stirred and heated for 10 minutes. Then, 55.8 parts of 1-diethylamino-2-chloropropane hydrochloride is added in one portion and the resulting mixture is refluxed and stirred for 16 hours. The solvent is then evaporated by heating the mixture on a steam bath under reduced pressure and the residue is taken up in water and ether. The ether layer is separated and extracted with two 500 ml. portions of 0.5 N hydrochloric acid followed by one extraction with 500 ml. of 1 N hydrochloric acid. The combined acid extracts are washed with ether and the acid layer is made alkaline by the addition of 50% sodium hydroxide and then extracted with ether. The ether solution is dried, treated with charcoal, and filtered. The filtrate is concentrated first on a steam bath and then under reduced pressure and distillation is continued to give a product boiling at about 160–200° C. at 10.3 mm. pressure. This product is redistilled to give material boiling at about 168–180° C. at 0.1 mm. pressure. The oil is dissolved in 2-propanol and mixed with a 2-propanol solution of hydrogen chloride. The precipitate which forms is separated by filtration and crystallized twice from absolute ethanol to give a hydrochloride melting at about 201–210° C. The hydrochloride is dissolved in water and the solution is made alkaline with sodium hydroxide and then extracted with ether. The ether solvent is then evaporated from the extract and the residual base is recrystallized from absolute ethanol to give 10-(2-diethylaminopropyl)-2-methylphenothiazine melting at about 77–80° C.

To a solution of 9.5 parts of 10-(2-diethylaminopropyl)-2-methylphenothiazine in 56 parts of 2-butanone in a pressure bottle is added 14.6 parts of ethyl bromide. The pressure bottle is closed and placed in a steam oven for 66 hours. The mixture is then cooled and ether is added. An oil forms but this solidifies on standing. The solid is separated by filtration and recrystallized twice from acetone to give diethylmethyl[1-(2-methyl-10-phenothiazinyl)-2-propyl]ammonium bromide melting at about 181–185° C.

Diethylmethyl[1 - (2-methyl-10-phenothiazinyl)-2-propyl]ammonium bromide is reacted with silver cyclohexanesulfamate according to the procedure described in Example 2 to give diethylmethyl[1-(2-methyl-10-phenothiazinyl)-2-propyl]ammonium cyclohexanesulfamate.

What is claimed is:
1. A compound of the formula

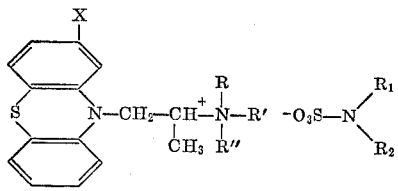

wherein R, R', and R" are each lower alkyl; X is selected from the group consisting of hydrogen, chlorine, and methyl; $R_1$ is selected from the group consisting of cyclohexyl and lower alkyl; and $R_2$ is selected from the group consisting of hydrogen and lower alkyl.

2. A compound according to claim 1 which has the formula

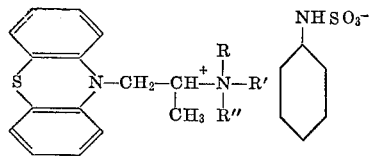

wherein R, R', and R" are each lower alkyl.

3. A compound according to claim 1 wherein X is hydrogen; R, R', and R" are each ethyl; $R_1$ is cyclohexyl; and $R_2$ is hydrogen, said compound being [1-(10-phenothiazinyl) - 2-propyl]triethylammonium cyclohexanesulfamate.

4. A compound according to claim 1 wherein X is hydrogen; R is methyl; R' and R" are each ethyl; $R_1$ is cyclohexyl; and $R_2$ is hydrogen, said compound being diethylmethyl[1 - (10-phenothiazinyl)-2-propyl]ammonium cyclohexanesulfamate.

5. A compound according to claim 1 wherein X is hydrogen; R is methyl; R' and R" are each ethyl; $R_1$ is butyl; and $R_2$ is hydrogen, said compound being diethylmethyl[1-(10-phenothiazinyl)-2-propyl]ammonium butylsulfamate.

References Cited
UNITED STATES PATENTS
3,155,652  11/1964  Cusic _____ 260—243

HENRY R. JILES, Primary Examiner

H. I. MOATZ, Assistant Examiner

U.S. Cl. X.R.
424—247